(12) United States Patent
McDowell

(10) Patent No.: US 6,769,774 B2
(45) Date of Patent: Aug. 3, 2004

(54) AMBIENT LIGHT TOLERANT IMAGE PROJECTION METHOD AND SYSTEM

(75) Inventor: Chandler T. McDowell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 10/294,990

(22) Filed: Nov. 14, 2002

(65) Prior Publication Data

US 2004/0095561 A1 May 20, 2004

(51) Int. Cl.$^7$ ............................................. G03B 21/14
(52) U.S. Cl. ........................................ 353/84; 359/443
(58) Field of Search .......................... 353/84, 31, 122; 359/443, 449, 460

(56) References Cited

U.S. PATENT DOCUMENTS

| | | | |
|---|---|---|---|
| 5,193,015 A | * 3/1993 | Shanks | 349/115 |
| 5,452,024 A | 9/1995 | Sampsell | 348/755 |
| 5,715,083 A | * 2/1998 | Takayama | 359/443 |
| 6,224,216 B1 | 5/2001 | Parker et al. | 353/31 |
| 6,231,190 B1 | 5/2001 | Dewald | 353/31 |
| 6,332,693 B1 | 12/2001 | Dove et al. | 362/251 |
| 6,375,330 B1 | 4/2002 | Mihalakis | 353/31 |
| 6,400,505 B1 | 6/2002 | Funazaki et al. | 359/456 |
| 6,421,181 B1 | 7/2002 | Yoshida et al. | 359/619 |
| 6,428,169 B1 | * 8/2002 | Deter et al. | 353/20 |
| 6,529,322 B1 | * 3/2003 | Jones et al. | 359/443 |
| 2003/0117704 A1 | * 6/2003 | Lippey et al. | 359/443 |

* cited by examiner

*Primary Examiner*—William Dowling
(74) *Attorney, Agent, or Firm*—Richard F. Frankeny; Winstead Sechrest & Minick P.C.; Casimer K. Salys

(57) ABSTRACT

A method and systems for projecting an image onto a screen in high ambient light. The image is composed as pixels comprising selected intensities of preselected bands of visible light. The pixels are created by modulating three frequencies of light corresponding to hues in the red, green, and blue spectrum. The modulated light selectively generates pixels of a frame of the image. A diffusive projection screen has a triple bandpass light filter surface that selectively transmits preselected bands of light frequencies around the red, green, and blue spectrums of the modulated light source. The triple bandpass light filter is used with projection screens in front and rear projection systems. The hues of red, green, and blue may be generated from LEDs or from extracting the frequencies from a broadband source. The modulator system may comprise a time multiplexed single modulator design or a triple modulator design.

21 Claims, 7 Drawing Sheets

AMBIENT LIGHT TOLERANT IMAGE PROJECTION METHOD AND SYSTEM

TECHNICAL FIELD

The present invention relates to image projection systems, and in particular, to image projection systems designed to reduce the effects of ambient light on image quality.

BACKGROUND INFORMATION

Present color projectors work by modulating, in time and space, three color bands of light: red, green and blue. This modulated light falls upon a screen that diffusely reflects substantially all incident light. These types of diffuse screens appear white in ambient room light since they are designed to reflect all frequencies of light. This means that the darkest "black" that can be presented on this type of screen is limited by the ambient light conditions. This is why the lights are off in movie theaters and dimmed in conference rooms. Rear projection systems project the modulated light on the back of a diffusive display screen. In the same manner, the projected display image competes with ambient light to set contrast and background darkness. Image projection would be greatly enhanced if projection images could be made to appear as natural objects viewed in ambient light. Likewise, the projection environment would be greatly improved if the ambient light levels could be adjusted for reasons independent of a desired contrast of the display.

Therefore, there is a need for a method and system of projection that allows a displayed image to have a contrast and background darkness based on the projected image and not the ambient light levels.

SUMMARY OF THE INVENTION

A projector system includes a modified light source and a modified projection screen. The light source uses preselected bands of visible light which are modulated in conventional ways to generate an image. The projection surface of a diffusive projection screen includes a triple bandpass filter with band passes corresponding to the same preselected bands of visible light of the light source. The modulated preselected bands of visible light from the projector pass through the triple bandpass filter and are transmitted back to a viewer as an image when a frame of modulated pixels are projected onto the diffusive screen. Substantially all ambient light impinging on the projector screen save that which corresponds to the pass bands of the triple bandpass filter is adsorbed or blocked.

A rear projector uses a diffusive projection screen which has the triple bandpass filter on the view side of the screen. In this manner, projected light from the modulated preselected bands of visible light impinge on the projection screen forming an image. The image comprising the modulated preselected bands of visible light passes through the triple bandpass filter and is viewed by an observer. The back or front ambient light not in the same frequency bands as the pass bands of the filter is blocked by the filter.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings in which.

DETAILED DESCRIPTION

Figure 1:
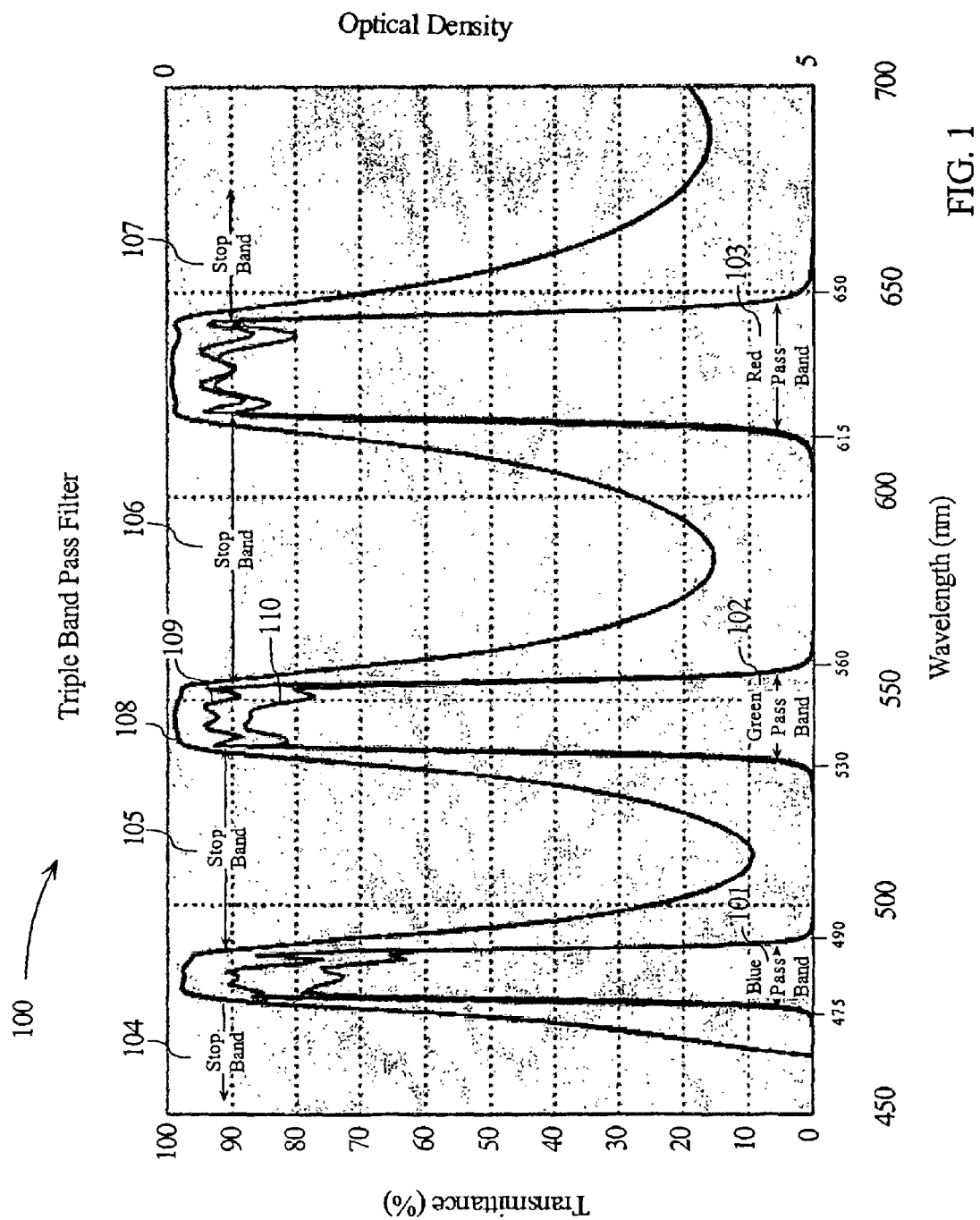
FIG. 1 illustrates the pass bands of a light filter useable with embodiments of the present invention.

In the following description, numerous specific details are set forth to provide a thorough understanding of the present invention. For example, specific logic functions and the circuitry for generating them may be described; however, it would be recognized by those of ordinary skill in the art that the present invention may be practiced without such specific details. In other instances, well-known circuits or systems may have been shown in block diagram form in order not to obscure the present invention in unnecessary detail. Refer now to the drawings wherein depicted elements are not necessarily shown to scale and wherein like or similar elements are designated by the same reference numeral by the several views. In the following, the terms frequency bands, wavelength bands, or simply bands of visible light may be used to describe frequency bands of light which produce various colors of light in the visible spectrum. Likewise in describing light filter characteristics, bandpass and pass band may be used interchangeably to refer to a band of frequencies for which the light filter is substantially transparent. A light filter may be termed to substantially block light frequencies outside of a band of light frequencies. This means that the intensities of the light frequencies outside of the band of light frequencies are sufficiently reduced by the light filter so that they may not be perceptible to a viewer when compared to intensities of light frequencies within the band of light frequencies. The statement, a band of light frequencies around a particular light frequency, refers to a continuous spectrum of light frequencies where the particular light frequency is normally centered within the continuous spectrum of light frequencies.

The "white" light that a projector emits is spectrally different from ambient "white light." The energy of ambient white light is spread over the whole visible spectrum while a projector system may have light energy in only three narrow bands. The reason that both of these light sources are called white light is that the biological mechanism for perceiving color responds the same to the ambient white light as to the projector white light. The eye, specifically the retina, has three color receptors or detectors. While they have broad overlapping sensitivity curves in the three color frequencies when they are activated (neurons in the receptors fire in response to energy levels), all the information concerning the individual frequencies that caused the response is lost after detection. It is the combination of receptor responses that convey the "perception" of color in the brain which interprets the signals from the eye. Two spectrally different sources that cause the same receptor responses will cause similar perceptions of color. This means that there are multiple spectrums of light that can cause the same color perceptions. Key to understanding embodiments of the present invention is the notion of choosing a light spectrum for projection that produces desired color perceptions while being substantially different from the spectrum of ambient light. This allows the two spectrums to be manipulated in a substantially independent manner. Embodiments of the present invention do manipulation of the visible light spectra using narrow band visible light filters.

In a color additive system, primary light colors corresponding to red, blue, and green wavelengths of light may be used to generate a full pallet of colors by modulating each particular band of light and projecting them on the same "pixel" of a reflective diffusive projection screen so that the light bands are reflected back to a viewer's eyes. A pixel (PIX [picture] ELement) is generally defined as the smallest addressable unit on a display screen. The higher the pixel resolution (the more rows and columns of pixels), results in more image information being displayed. In storing an image, each pixel contains one or more bits to define the intensity of the color frequencies making up the pixel. The greater this "bit depth," the more shades or colors can be represented. The most economical system is monochrome, which uses one bit per pixel (on/off). Gray scale and color displays typically use from 4 to 24 bits per pixel, providing from 16 to 16 million colors. On a screen (projection, graphic or television), color pixels are made up of one or more visually coincident (time and/or space) dots of primary colors (e.g., red, green, and blue). Monochrome and gray scale systems use one dot per pixel. For monochrome, the dark pixel is the absence of energized light. For gray scale, the pixel is energized with different intensities, creating a range from dark to light. Color systems use a red, green, and blue dot per pixel, each of which is energized to different intensities, creating a range of colors perceived as the mixture of these dots. Black is the absence of all the three colors and white is the presence of all the three colors of light at appropriate intensities.

A large number of such pixels may then be used to form a frame of an image. In this manner, the viewer perceives the variety of colors that make up an image. By generating pixels with sufficient density, images of various quality may be produced. Alternately, the pixels may be projected through a diffusive transmissive projection screen by a back projector. The colors are focused on the plane of the projection screen where the image "appears." The light rays from the image on the screen then arrive at a viewer's eyes where the colors of the individual pixels making up the images are "perceived" by the viewer. Color projectors make use of the additive system to form large images either for presentations, television, etc. To form the images for projection, the narrow bands of light are produced, their intensities are modulated corresponding to desired colors, and the images are projected onto a screen as pixels at such a rate that the user perceives a flicker-free presentation.

There are multiple possible sources for generating narrow bands (frequency bands) of light. For example, one may generate narrow bands of light by selectively filtering broadband light from a conventional "white" light source. Generating light using this method, however, may prove inefficient. Another method may use light emitting diodes (LEDs) or semiconductor lasers. LEDs are the light source used in the detailed description of the present disclosure with the understanding that any narrow band source of light with the appropriate wavelengths may be used. LEDs may be fabricated to emit a fairly narrow band of light. Each LED frequency band does not have to be exactly the same as the corresponding pass band of the bandpass filters. In fact, the frequency bands may be narrower or wider wherein wider frequency bands simply lead to a loss of reflected light. Three LED light sources, one for each color, may be used in a single modulator or a triple modulator design to generate pixels for an image.

There are also several ways of modulating the narrow bands of light. A typical single modulator design would present one color for the frame which is spatially modified (i.e., shuttered) so that the correct intensity for each pixel location is presented. For example, this may be done with a digital micro-mirror (DMD) or using a liquid crystal display (LCD) "shutter" system. In this method, only one third of the light is used at a time and depending on how the light is generated, two thirds of the light may be wasted. A sequential color recapture (SCR) system may also be used with the DMD or LCD which has all three colors present at one time. SCR uses a specially designed color wheel which sequentially presents each of the three colors such that the "unused" colors are recaptured for reuse with low loss.

DMD is the heart of a system referred to as Digital Light Processing (DLP). DLP is a data projection technology from Texas Instruments Inc. (TI). The technology uses a DMD, a chip with from 400,000 to more than two million light switches that divert or reflect light. Micro-electromechanical mirrors, each 16 micrometers square, are built on top of a CMOS memory chip wherein each mirror is controlling the state of a memory bit.

In a single modulator design using three colors, a conventional color wheel may be used to block two light bands during the period when the particular third light band is being modulated. The LED sources may also be cycled on and off so that only the correct source is on during the appropriate time in a time multiplexed mode. Switching individual light would remove the need for the color wheel. Since the modulations occur at the frame rate of 30 to 100 frames per second to conform to a flicker-free image projection, thermal cycling may not be a significant problem.

In the triple modulator design, there would be an LCD source of the appropriate wavelength for each modulator. The resulting light would be combined into a single projected image just as in a conventional triple modulator design. This removes the need to have a prism to split the colors out of a broadband source.

Since light is not easily deflected like an electron beam used in cathode ray tubes (CRT), some sort of spatial modulator is used to formulate the frame of an image. For example, in a single modulator, a particular one of the primary colors is presented and each pixel is shuttered such that each pixel receives the desired intensity needed to generate its color. The other two colors are likewise presented and modulated. This is accomplished at a rate such that the eye perceives the combination of the three modulated light frequencies as a single additive color. In a triple modulator, each color is modulated separately and then the results are combined before transmitted to the eyes of a viewer.

As a light source, LEDs are very efficient light generators which are considerably more light efficient than incandescent sources. Using LED light sources leads to an increase in overall projector energy efficiency and reduces heat loading thus reducing cooling requirements. A reduced cooling requirement may result in a projector system without a fan and a reduction in noise output by the projector. Projector noise reduction is important for home cinema applications and even business applications.

The present invention uses selected narrow bands of visible light (e.g., red, green, and blue). These narrow bands of light may be modulated in conventional ways and projected on a special modified projection screen. The projection screen includes a light filter with three narrow pass bands that let the red, green, and blue bands of light through but block other visible light. Such pass bands may be as narrow as ten (10) nanometers or less in wavelength. Behind the light filter would be a diffuse reflecting projection surface which would reflect transmitted light back through the light filter to the viewer. Most ambient light would be absorbed by the filter depending on how narrow the filter pass bands. Ambient light with light wavelengths within the pass bands would be reflected. Additionally, band absorption filters may be fitted to ambient light sources (lights, windows, etc.) that would block the three desired light bands. While this may not appreciably change the character of the light or reduce by more than ten percent (10%) the amount of ambient light, it would further reduce the amount of undesired light reflected by the screen by another 10 to 100 times.

Light filters may be constructed using materials (e.g., colorants) whose molecular properties have desired combinations of absorption, scattering, and transmission at selected light frequencies. Other light filters may be constructed with materials whose thicknesses and indexes of refraction may be selected to provide the desired filter characteristics.

Selective absorption in the visible spectrum is the first half of the way colorants develop their specific colors. An example of this selective absorption would be a colorant that selectively absorbs all the wavelengths of white light except the red portion in the 600 to 700 nanometer range. This colorant would then transmit and/or scatter the remaining red light, which would classify it as a red colorant. If the colorant scattered the remaining red light then it would make materials to which it was added appear red. If the colorant transmitted the red light then it would be transparent to red. Likewise, a colorant that absorbs the red, orange, yellow, blue, indigo and violet portions of white light would appear as a green colorant. The light illuminating an object must contain the wavelengths the colorant will transmit or scatter to develop its inherent color. As an example, if the light illuminating a red apple does not contain any red light the apple will appear black to the observer.

Colorants may be added to materials that are normally transparent to all light frequencies in the visible range to produce selective reflection or transparency. If the colorant sufficiently scatters light in a selected light frequency and is transparent to other frequencies then the colorant will make the material appear as the color determined by the selected light frequency. If the colorant absorbs light at all frequencies except for the selected light frequency and the colorant does not scatter the selected light frequency, then the colorant will make the material transparent to the selected light frequency. In this manner, material layers may be formulated to make multiple frequency bandpass filters or material that is reflective at multiple selected frequencies.

FIG. 1 is a transfer function illustrating pass bands of a triple (frequency) bandpass filter for red, blue, and green visible light used to create images useable with embodiments of the present invention. The left vertical axis represents the percentage of light transmitted and the horizontal axis represents the wavelengths of light in nanometers. The right vertical axis represents the optical density. Optical density defines, for a given wavelength, an expression of the transmittance of an optical element. Optical density is expressed by $\log_{10}(1/T)$, where T is transmittance. The higher the optical density, the lower the transmittance.

In FIG. 1, the bandpass 101 is transparent to blue light, bandpass 102 is transparent to green light, and bandpass 103 is transparent to red light. The transfer functions in FIG. 1 show theoretical bandpass curve 109, actual bandpass curve 110, and optical density curve 108. Since a triple bandpass filter 100 absorbs light frequencies outside the pass bands, these areas may be referred to as stop bands, for example, stop bands 104–107 as illustrated in FIG. 1.

A light filter 100 (with characteristics as shown in FIG. 1) may be fabricated by material layers applied onto the projection surface of a diffusive projection screen. The first material layer, for example, is transparent to light with wavelengths greater than 650 nanometers and absorbs or blocks light with wavelengths less than 650 nanometers. A second material layer absorbs light with wavelengths between 560 and 615 nanometers and is transparent to light outside of this frequency band. A third material layer absorbs light with wavelengths between 490 and 530 nanometers and is transparent to light outside of this frequency band. Finally, a fourth material layer is transparent to light with wavelengths greater than 475 nanometers and blocks light with wavelengths less than 475 nanometers. A light filter with characteristics illustrated in FIG. 1 is useable with embodiments of the present invention.

Light filter 100 has a bandpass 101 for blue light, bandpass 102 for green light, and bandpass 103 for red light. The stop bands where light is absorbed are illustrated by stop band 104 for frequencies greater than blue light of wavelength 475 nanometers. Likewise, the stop band 105 spans 490 nanometers to 530 nanometers, stop band 106 is between 560 and 615 nanometers and finally, stop band 107 is for light with wavelengths greater than 650 nanometers.

A filter with the characteristics of FIG. 1 may be constructed with layers or polymeric materials which absorb light in frequency bands and are transparent in other bands. The transparency of a polymer material is directly related to the, absence of or very low amounts of, scattering in the material. In this case, a colorant and/or the polymer itself may selectively absorb a certain light frequency and scatter the remaining light frequencies not absorbed, resulting in a perceived color. However, if instead of scattering the remaining light frequencies not absorbed, the sample lets this remaining light pass through, then the material is transparent at the selected frequencies.

Two types of colorants are used in polymer materials: pigments, which are small particles which get dispersed in the polymer matrix, and dyes, which are actually soluble in the polymer matrix itself. Soluble dyes only absorb light, they do not scatter light resulting in selective transparency samples. As stated, the ability of a material to let the selected light frequencies pass through a sample and not scatter that incident light is transparency. An example of this would be the use of a red dye to color Lexan® polycarbonate resin automobile taillight lenses. In this example, the red dye selectively absorbs all but the red light, which it passes through the taillight lens.

Alternately, light filter 100 may be fabricated by formulating a combination of optical materials (e.g., polymeric materials) for coating a projection surface. Like individual material layers, the coating would be substantially transparent to light in the desired pass bands (e.g., red, blue, and green) and opaque to light outside these pass bands. A filter of this type may be made by adding colorants with the desired optical properties to polymer coating materials that are normally transparent to visible light frequencies. In the cases where light filter 100 is transmissive at the desired frequencies, a dispersive, reflective surface provides the reflection of the light frequencies that pass back to the viewer.

In another embodiment, light filter 100 itself may be constructed to be selectively reflective. In this embodiment, light filter 100 may be constructed with a first material which reflects a first band of light (e.g., red) while transmitting all other frequencies. A second material is coupled to the transmission side of the first set of layers. The second material reflects a second band of light (e.g., blue) while transmitting all other frequencies. Since the first material is transparent to all light except red, then the blue light will reflect back with the red light. Finally a third material is coupled to the transmission side of the second set of layers. The third material reflect a third band of light (e.g., green). Again, the first material and the second material are transparent to green and it is reflection along with the red and blue light. A filter of this type may be fabricated by individual layers of materials or a coating. In either case colorants are added (e.g., pigments) which scatter red, green, and blue light while transparent to the other visible light frequencies.

A reflective light filter structure may also be fabricated with materials with varying thicknesses and indexes of refraction that cause constructive and destructive interference to produce the desire optical properties. One such filter is the Rugate filter structure which uses materials with a continuously variable index of refraction to realize the desired material properties. For example, Barr Associates Barr Associates, Inc., 2 Lyberty Way, Westford, Mass. 01886, USA, makes light filters based on the Rugate technology for a variety of applications.

In another embodiment, light filter 100 is transmissive and is constructed of layers of material that have varying material thicknesses and indexes of refraction so the composite is transmissive at selected narrow light frequency bands. For example one design example is for normal incidence on an ordinary glass substrate. Three materials types are used for the material layers: Au, $SiO_2$, and $TiO_2$. The design, which has two narrow transmission bands at 770 and 920 nanometers (nm), consists of 13 material layers. The following illustrates each material thickness with the first layer closest to the substrate and thickness given in nanometers:

Au 16.58 nm, $SIO_2$ 115.39 nm, $TIO_2$ 96.33 nm, $SIO_2$ 49.67 nm, $TIO_2$ 39.24 nm, $SIO_2$ 152.40 nm, $TIO_2$ 93.69 nm, $SIO_2$ 270.66 nm, AU 4.16 nm, $SIO_2$ 10.49 nm, $TIO_2$ 95.25 nm, $SIO_2$ 102.01 nm, and AU 10.76 nm. Although this exemplary filter is not in the desired bands for the present invention, it illustrates how bandpass transmission filters are constructed using varying thicknesses of materials with selected indexes of refraction.

Other combinations of materials may be used to create a triple bandpass filter with characteristics similar to those shown in FIG. 1 (e.g., having shifted pass bands) and still be within the scope of the present invention.

Figure 2:
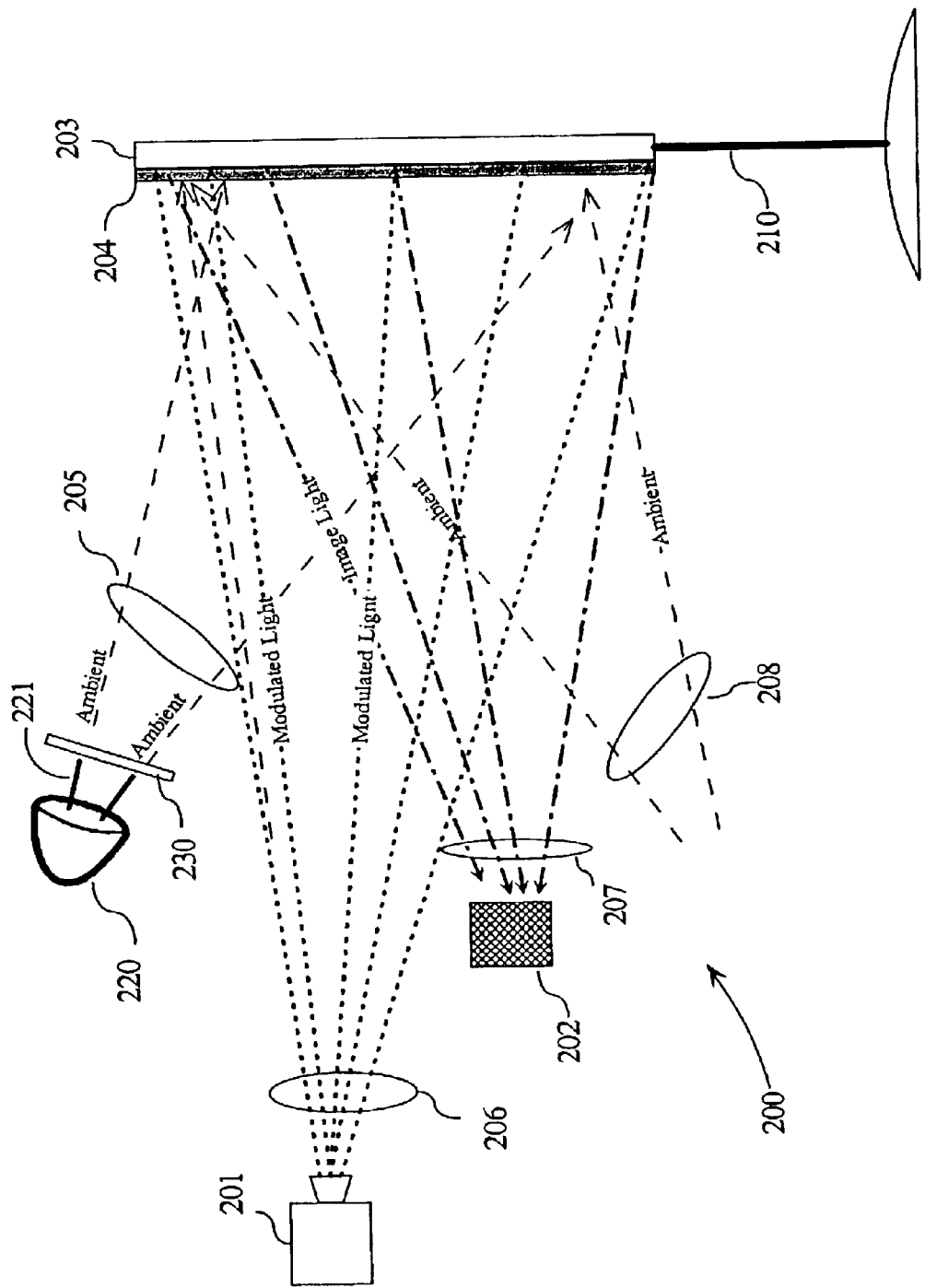
FIG. 2 illustrates a front projection system according to embodiments of the present invention.

FIG. 2 illustrates light rays in a front projector system 200 according to embodiments of the present invention. Projector 201 projects modulated light 206 which comprises a plurality of visible light frequencies (e.g., red, blue, and green light). The intensity of each light frequency is modulated to generate a variety of colors when the reflected combinations are received by the eye of a viewer. Modulated light 206 impinges on light filter 204 integral to diffusive projector screen 203. Light filter 204 is fabricated to have transmissive characteristics similar to exemplary light filter 100 illustrated in FIG. 1. Since the modulated light is composed of light with wavelengths in the red, blue, and green spectrum, it falls within the narrow pass bands of light filter 204 and reaches the reflective projection surface of diffuse screen 203 (the other frequencies of light are absorbed). The bands of modulated light are reflected at each pixel location to create a particular color at that location for the projected image. This reflected light 207 again passes through filter 204 before it arrives at viewer 202 as the image on diffusive projector screen 203. Ambient light 205 and 208 represents light that reaches the projector screen 210 from ambient source (e.g., ambient light source 220) unrelated to the projected image. All of the ambient light 205 and 208 which is not in the three frequency pass bands of filter 204 is blocked from reaching diffusive projector screen 203. Therefore, most of the ambient light never reaches the eyes of the viewer 202 resulting in a projected image with much better contrast than is achievable with prior art projector systems. Only those frequencies of the ambient light 205 and 208 that are in the pass bands of light filter 204 reach the projection surface of reflective screen 203. Diffusive projector screen 203 is fabricated (without the filter 204) to reflect all light and as such would appear "white" to a viewer when all frequencies of light were present. If no light other than the modulated light from projector 201 reached screen 203, then screen 203 would appear "black" when no red, blue, or green light is being projected (other sources of light are blocked). In reality, the contrast is dictated by how much unwanted light in the bass bands contained in the ambient light 205 and 208 that reaches reflective screen 204.

Ambient light source 220 may be fitted with a light filter 230 which blocks light frequencies in the red, blue, and green spectrum. Red, blue, and green light frequencies in ambient light 221 are filtered so that ambient light 205 has little light in these frequencies. The light source (not shown) producing ambient light 208 may also be fitted with a light filter similar to light filter 330.

Figure 3:
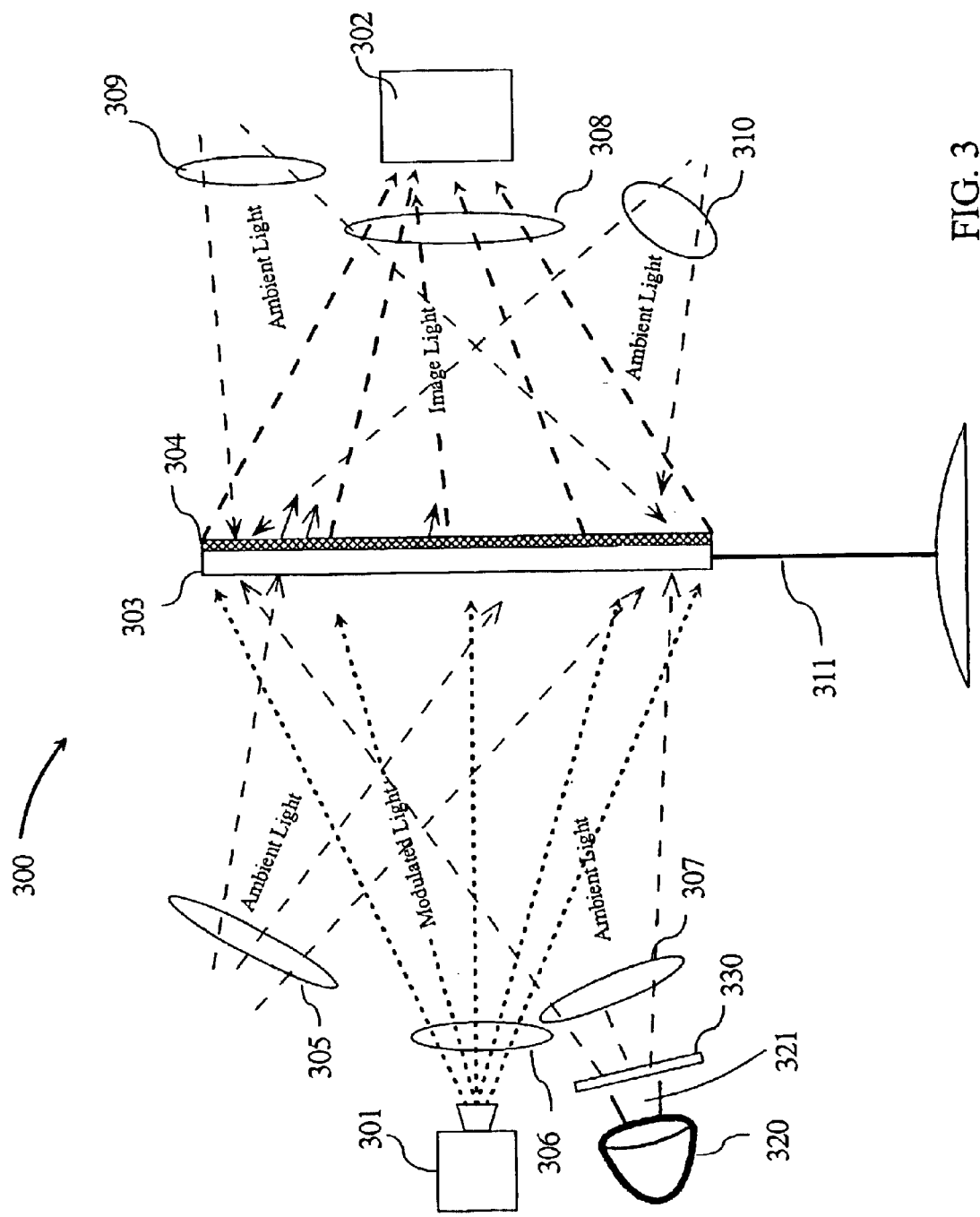
FIG. 3 illustrates a rear projection system according to embodiments of the present invention.

FIG. 3 illustrates light beams in a rear projector system 300 according to embodiments of the present invention. Projector 301 projects and focuses modulated light 306 to the back of a projector screen 303 which generates an image. For a viewer 302 to see this image, the viewer must receive light 308. Since screen 303 is diffusive, each pixel of an image projected on screen 303 has light rays directed towards viewer 302. However, these light rays must first pass through light filter 304 which again has three pass bands (red, blue, and green) according to embodiments of the present invention. Since projector 301 creates images by modulating light in the red, blue, and green spectrum, filter 304 is designed to pass light frequencies only within narrow band around these frequencies. Ambient light 305 and 307 also impinge on the back of diffusive screen 303. Only that small portion of ambient light 305 and 307 which corresponds to the pass bands of filter 304 is transmitted to viewer 302. Substantially, all other visible frequencies of the ambient light are absorbed by filter 304. Exemplary ambient light 309 and 310, which impinges on the viewer side of filter 304, undergoes a similar process by filter 304. Frequencies of ambient light 309 and 310 which are outside of the pass bands of filter 304 are absorbed and do not reach the diffusive screen 303. Only small portions of ambient light 309, 310, 305, and 307, within the pass bands of filter 304, are transmitted from screen 303 and reaches viewers 302. Again, this results in a much higher contrast for displaying images on projector screen 311 in rear projection system 300 as with front projection system 200 illustrated in FIG. 2.

Ambient light source 320 may be fitted with a light filter 330 which blocks light in the red, blue, and green light bands. Red, blue and green light frequencies in ambient light 321 is filtered so that ambient light 307 has little light in these frequencies. The light sources (not shown) producing ambient light 305, 309 and 310 may also be fitted with a light filters similar to light filter 330. This would additionally improve the contrast for displaying images on projector screen 311.

Figure 4:
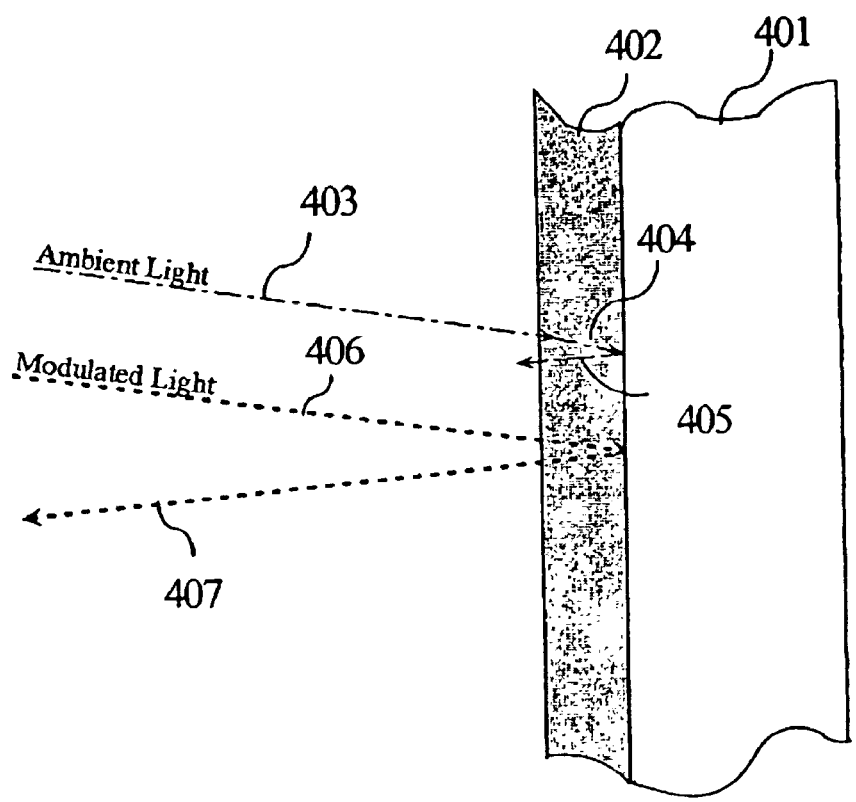
FIG. 4 is a detail of a portion of a projection screen in a front projection system according to embodiments of the present invention.

FIG. 4 illustrates in more detail the light filter and diffusive screen interface of a diffusive screen 401 which has a triple bandpass light filter 402 according to embodiments of the present invention. Modulated light 406 is made up of selected bands of light in visible frequency (e.g., red, blue, and green). The modulated light passes through triple bandpass filter 402 relatively unattenuated. Ambient light 403, on the other hand, is mostly absorbed and only the portion 404 reaches screen 401 and is reflected as light 405.

Figure 5:
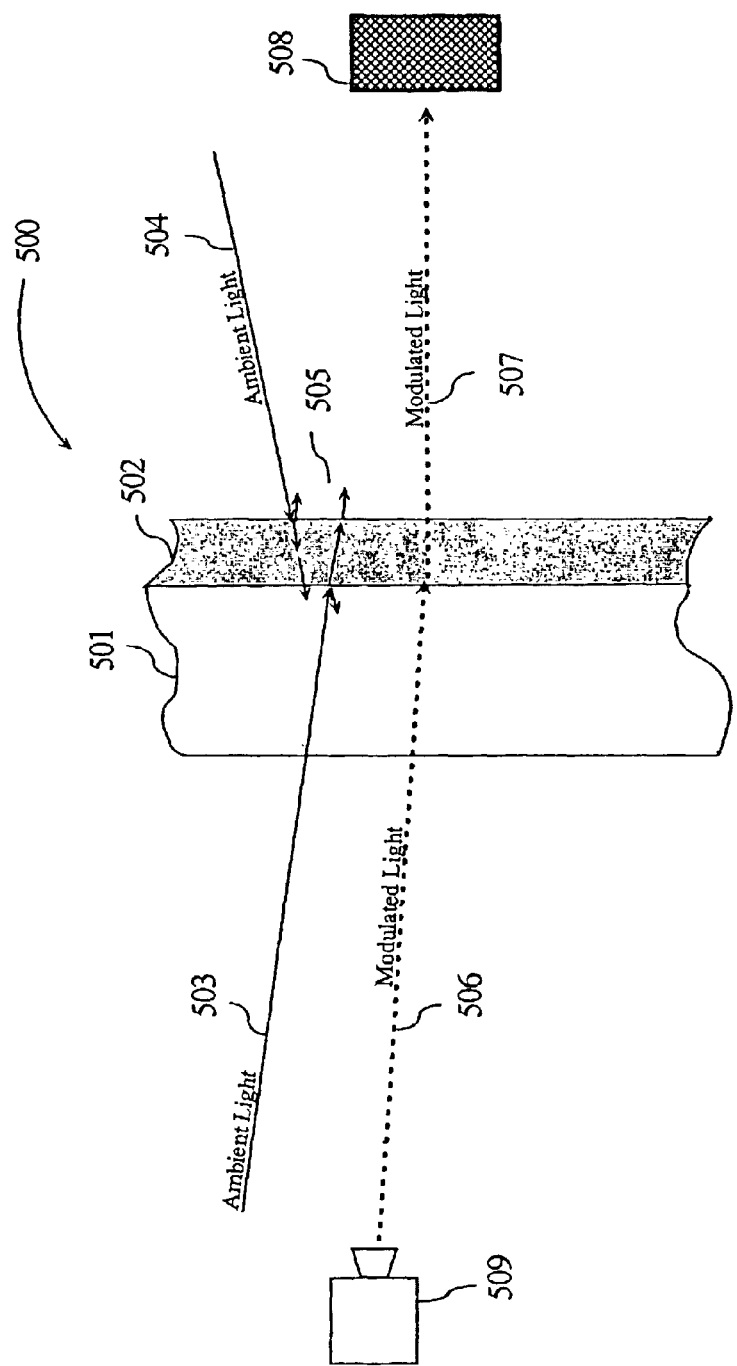
FIG. 5 is a detail of a portion of a projection screen in a rear projection system according to embodiments of the present invention.

FIG. 5 illustrates in more detail the light filter and diffusive screen interface of a diffusive screen 501 which has a triple bandpass light filter 502 for a rear projection system according to embodiments of the present invention. Modulated light 506 from projector 509 is focused on a projection surface and passes through the diffusive screen 501 where it impinges on bandpass filter 502. Bandpass filter 502 has three narrow pass bands. Since the modulated light is composed of selected bands of light in the visible spectrum (e.g., red, blue, and green) corresponding to these pass bands, the modulated light passes through filter 502 relatively unattenuated and reaches viewer 508 as modulated light 507. On the other hand, only a small portion 505 of ambient light 503 within the pass bands of filter 502 is not absorbed which in turn may arrive at a viewer 508.

Figure 6:
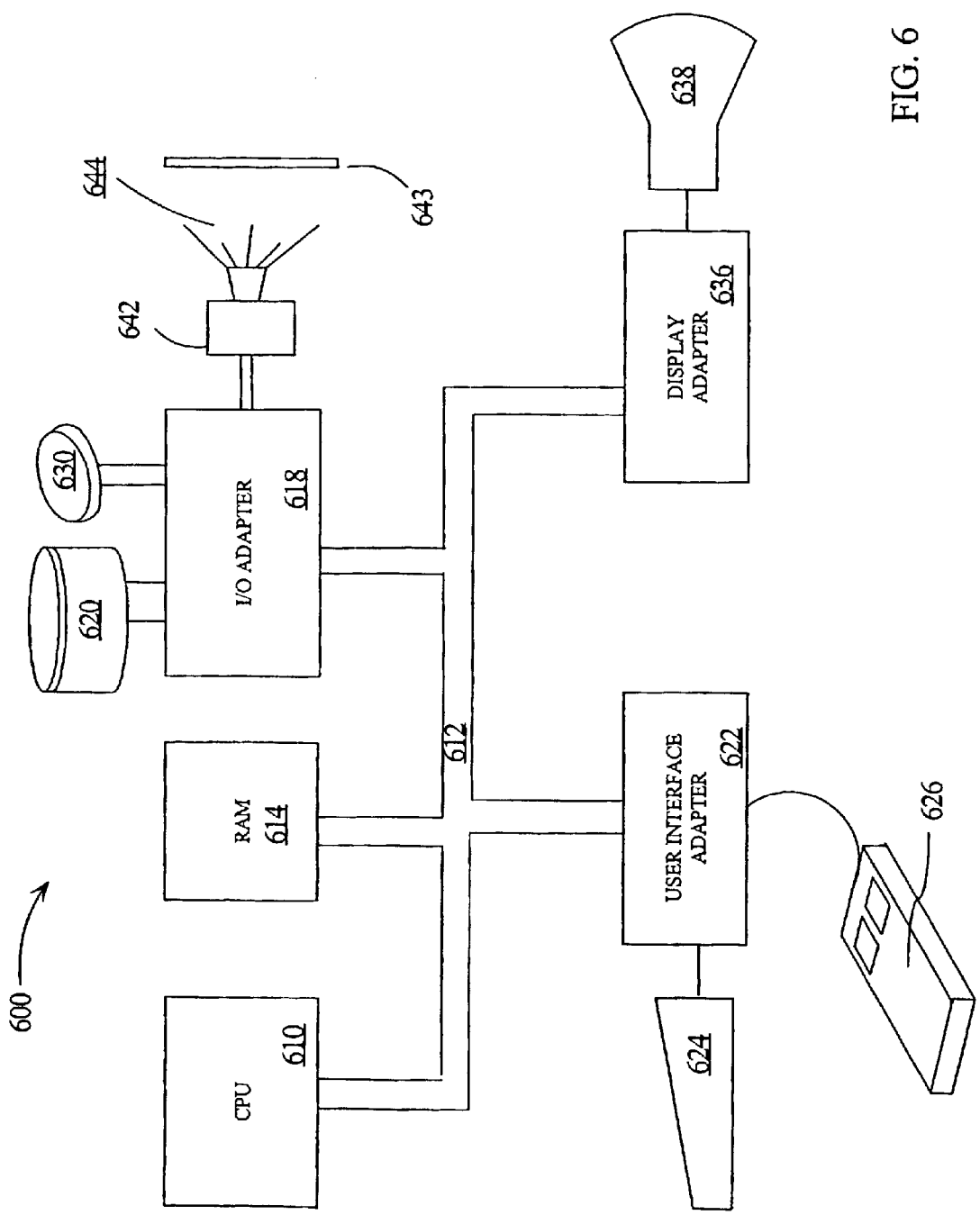
FIG. 6 is a block diagram of a computer controlled projection system according to embodiments of the present invention.
Figure 7:
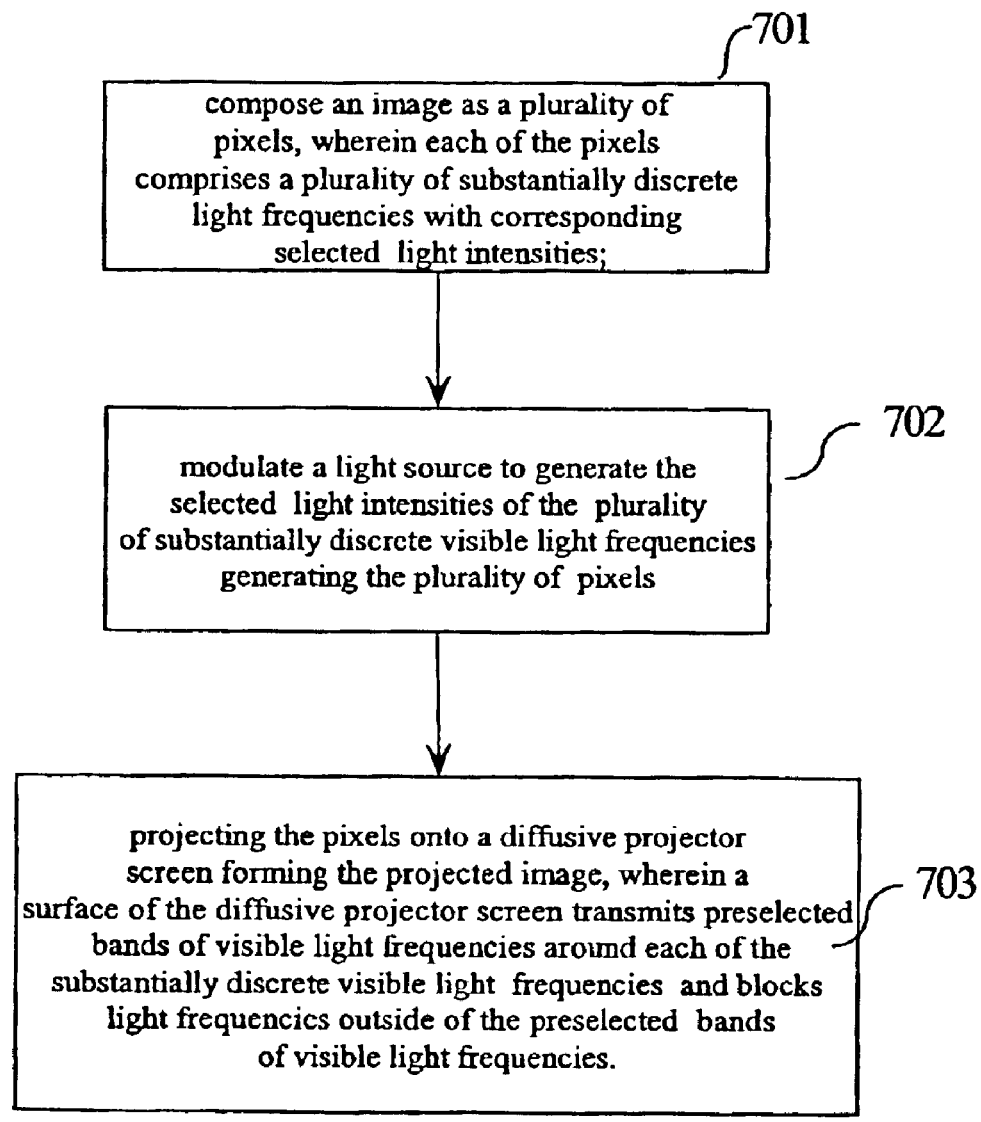
FIG. 7 is a flow diagram of methods steps used in embodiments of the present invention.

FIG. 6 illustrates a computer controlled projector system 600 which may use a projector and projection screen according to embodiments of the present invention. CPU 610 may be used to compose images or to receive image data from a media device 630 like a compact disc (CD) or digital versatile disc (DVD). The image data defines images as frames of pixels. CPU 610 may also store image data in RAM 614 which is coupled to CPU 610 via system bus 612. Likewise image data may be stored on disk storage system 620 which is coupled to CPU 610 via I/O adapter 618 and bus 612. Image data may then be sent to projector 642 which comprises a light source(s) and modulator(s) according to embodiments of the present invention. Modulated light 644 is projected onto projection screen 643 which is modified to have a light filter according to embodiments of the present invention. Composed images may also be sent to display 638 via display adapter 636 for preview, display, or editing. Keyboard 624 and mouse 626 are coupled to CPU 610 via user interface adapter 622 and may be used to control operations of projector 642. Other computer configurations with different features may be used and still be within the scope of the present invention.

FIG. 701 is a flow diagram for method steps used in embodiments of the present invention. In step 701, a image is composed as a plurality of pixels comprising narrow bands of visible light with corresponding selected intensities. In step 702, sources of light corresponding to the narrow bands of light are modulated to generate the corresponding selected intensities forming modulated narrow bands of light frequencies. In step 703, the modulated light frequencies are projected onto a diffusive projection screen that has a projection surface modified with a light filter with band passes corresponding to the narrow bands of light frequencies thereby forming a projected image.

Embodiments of the present invention may also be used in a rear projection system. The same projector described above may be used except the projector would project and focus an image on a diffusive transmissive display screen which has the triple bandpass filter structure on the viewer side. The light from the projector passes through the filter and the diffusive screen and forms an image. The triple bandpass filter acts to block any light not in the pass bands originating in either the front or the back of the projection screen.

Embodiments of the present invention modify the projector light source and projection screen such that the projection screen selectively reflects or projects light from the projector and not the ambient light. Such a screen will appear very dark gray or black in ambient light. Light from the projector is reflected at high efficiency making the images visible even in brightly lit rooms. The darkest dark that the system shows is in the order of 10 to 100 times darker than present prior art in the presence of ambient light. Embodiments of the present invention would improve the perceived contrast capability of the projector and would work with existing light modulating techniques such as LCD or digital light processing (DLP) technology.

Although the present invention and its advantages have been described in detail, it should be understood that various changes, substitutions and alterations can be made herein without departing from the spirit and scope of the invention as defined by the appended claims.

What is claimed is:

1. A method for displaying a projected image comprising the steps of:
   composing an image as a plurality of pixels, wherein a color of each of said plurality of pixels is formed as a plurality of visible light frequencies each with a selected light intensity;
   modulating each of said plurality of visible light frequencies to generate said selected light intensity corresponding to each of said plurality of pixels;
   projecting said plurality of pixels onto a projection surface of a projector screen thereby forming said projected image, wherein an area of said projection surface corresponding to a pixel of said plurality of pixels transmits to a viewer preselected bands of visible light frequencies around each of said plurality of visible light frequencies and blocks visible light frequencies outside of said preselected bands; and
   covering ambient light sources with an ambient light filter that absorbs said preselected bands of visible light frequencies and is substantially transparent to visible light frequencies outside of said preselected bands.

2. The method of claim 1, wherein said plurality of visible light frequencies comprises:
   a first light frequency band corresponding to a hue of visible red light;
   a second light frequency band corresponding to a hue of visible green light; and
   a third light frequency band corresponding to a hue of visible blue light.

3. The method of claim 1, wherein a portion of said projection surface corresponding to said projected image is covered with a light filter that is substantially transparent to said preselected bands and absorbs visible light frequencies outside of said preselected bands.

4. The method of claim 3, wherein said light filter comprises a plurality of layers of optical material such that said plurality of layers of optical material are substantially transparent to said preselected bands of visible light frequencies and absorb visible light frequencies outside of said preselected bands of visible light frequencies.

5. The method of claim 3, wherein said light filter comprises a composite optical material coating which is substantially transparent to said preselected bands of visible light frequencies and absorbs visible light frequencies outside said preselected bands of visible light frequencies.

6. The method of claim 3, wherein said projection surface of said projection screen is diffusively reflective and disposed facing said projector.

7. The method of claim 3, wherein said projection screen is a diffusively transmissive projection screen and said projection surface is opposite a surface of said projection screen facing said projector.

8. The method of claim 1, wherein said projection surface of said projection screen comprises a plurality of layers of optical material, wherein each of said plurality of layers of optical material has a selected thickness and index of refraction such that said plurality of layers of optical material reflect said preselected bands of visible light frequencies and destructively cancel visible light frequencies outside of said preselected bands of light frequencies.

9. A projection system for displaying a projected image comprising:
   a light source for generating a plurality of visible light frequencies;
   a modulator for generating a selected light intensity for each of said plurality of visible light frequencies for each of a plurality of pixels corresponding to an image;
   a projection screen having a projection surface, wherein an area of said projection surface corresponding to a pixel of said plurality of pixels transmits to a viewer preselected bands of visible light frequencies around each of said plurality of visible light frequencies and blocks visible light frequencies outside of said preselected bands of visible light frequencies;
   a projector for projecting said plurality of pixels onto said projector surface forming said projected image; and
   an ambient light filter covering an ambient light source, wherein said ambient light filter absorbs said preselected bands of visible light frequencies and is substantially transparent to visible light frequencies outside of said preselected bands of visible light frequencies.

10. The projection system of claim 9, wherein said plurality of visible light frequencies comprises:
    a first light frequency band corresponding to a hue of visible red light;
    a second light frequency band corresponding to a hue of visible green light; and
    a third light frequency band corresponding to a hue of visible blue light.

11. The projection system of claim 9, wherein said projection surface corresponding to said projected image comprises a light filter that is substantially transparent to said preselected bands of visible light frequencies and absorbs visible light frequencies outside of said preselected bands of visible light frequencies.

12. The projection system of claim 11, wherein said light filter comprises a plurality of layers of optical material such that said plurality of layers of optical material are substantially transparent to said preselected bands of visible light frequencies and absorb visible light frequencies outside of said preselected bands of visible light frequencies.

13. The projection system of claim 11, wherein said light filter comprises a composite optical material coating which is substantially transparent to said preselected bands of visible light frequencies and absorbs visible light frequencies outside of said preselected bands of visible light frequencies.

14. The projection system of claim 11, wherein said projection surface of said projection screen is diffusively reflective and disposed facing said projector.

15. The projection system of claim 11, wherein said projection screen is a diffusively transmissive projection screen and said projection surface is opposite a surface of said projection screen facing said projector.

16. The projection system of claim 9, wherein said projection surface of said projection screen comprises a plurality of layers of optical material, wherein each of said plurality of layers of optical material has a selected thickness and index of refraction such that said plurality of layers of optical material reflect said preselected bands of visible light frequencies and destructively cancel visible light frequencies outside of said preselected bands of light frequencies.

17. A computer controlled projection system for displaying a projected image comprising:
a central processing unit (CPU);
a random access memory (RAM);
an I/O adapter coupled to said CPU;
a bus system for coupling said CPU, RAM and I/O adapter;
a projector system coupled to said I/O adapter for receiving optical data defining pixels of an image as a plurality of visible light frequencies with corresponding selected light intensities, wherein said projection system includes a modulator for receiving said optical data and selectively modulating said plurality of visible light frequencies to generate each selected light intensity for each of said pixels in response to said optical data, a light source coupled to said modulator for generating said plurality of visible light frequencies, a projection screen having a projection surface wherein a pixel area of said projection surface transmits to a viewer preselected bands of visible light frequencies around each of said plurality of visible light frequencies and blocks visible light frequencies outside of said preselected bands of visible light frequencies, and a projector for projecting said plurality of pixels onto said projector screen forming said projected image; and an ambient light filter covering an ambient light source, wherein said ambient light filter absorbs said preselected bands of visible light frequencies and is substantially transparent to visible light frequencies outside of said preselected bands of light frequencies.

18. The computer controlled projection system of claim 17, wherein said plurality of visible light frequencies comprises:
a first light frequency band corresponding to a hue of visible red light;
a second light frequency band corresponding to a hue of visible green light; and
a third light frequency band corresponding to a hue of visible blue light.

19. The computer controlled projection system of claim 17, wherein said projection surface corresponding to said projected image comprises a light filter that is substantially transparent to said preselected bands of visible light frequencies and absorbs visible light frequencies outside of said preselected bands of visible light frequencies.

20. The computer controlled projection system of claim 19, wherein said projection surface of said projection screen is diffusively reflective and disposed facing said projector.

21. The computer controlled projection system of claim 19, wherein said projection screen is a diffusively transmissive projection screen and said projection surface is opposite a surface of said projection screen facing said projector.

* * * * *

UNITED STATES PATENT AND TRADEMARK OFFICE
CERTIFICATE OF CORRECTION

PATENT NO. : 6,769,774 B2
DATED : August 3, 2004
INVENTOR(S) : Chandler T. McDowell It is certified that error appears in the above-identified patent and that said Letters Patent is hereby corrected as shown below:

Column 13,
Line 3, following "outside" please delete "of".

Signed and Sealed this

Twelfth Day of April, 2005

JON W. DUDAS
*Director of the United States Patent and Trademark Office*